United States Patent [19]

Tilgner

[11] 4,218,203

[45] Aug. 19, 1980

[54] MULTI-STATION REACTION INJECTION MOLDING APPARATUS

[75] Inventor: Peter J. Tilgner, Akron, Ohio

[73] Assignee: The Upjohn Company, Kalamzoo, Mich.

[21] Appl. No.: 7,252

[22] Filed: Jan. 29, 1979

Related U.S. Application Data

[62] Division of Ser. No. 755,048, Dec. 28, 1976, Pat. No. 4,150,074.

[51] Int. Cl.² .......................... B29D 27/00; B29G 3/00
[52] U.S. Cl. .................................... 425/110; 425/543; 425/817 R
[58] Field of Search .................... 264/54, 53, DIG. 83, 264/51; 425/4 R, 110, 543, 817 R

[56] References Cited

U.S. PATENT DOCUMENTS

| | | | |
|---|---|---|---|
| 3,247,295 | 4/1966 | Burwell | 264/54 |
| 3,311,948 | 4/1967 | Axelsonn | 264/54 X |
| 3,745,203 | 7/1973 | Harper | 264/DIG. 83 |
| 3,843,100 | 10/1974 | Haas et al. | 366/76 |
| 3,970,732 | 7/1976 | Slaats et al. | 264/53 X |

FOREIGN PATENT DOCUMENTS

2218418  10/1973  Fed. Rep. of Germany.

OTHER PUBLICATIONS

Stewart; S. A., "Metering and Mixing Equipment for the Production of Urethane Foam Products", DuPont Bulletin, Elastomer Chemicals Department, Hr–32, Sep. 1958, Wilmington, Del., E. I. DuPont De Nemours & Co., Inc. pp. 3–6 and 14–16.

Dixon, S., "Polyurethane Foam Moulding", in *British Plastics*, Jan. 1963, pp. 24–27.

Musgrave, Ivor. "Modern Methods of Moulding Urethane Foams", in *Journal of Cellular Plastics*, Jul./Aug. 1969.

Metzger, S. N.; D. J. Prepelka, "Progress in Rim Technology", in *J. of Elastomers and Plastics*, vol. 8 (Apr. 1976), pp. 141–159.

*Primary Examiner*—Philip Anderson
*Attorney, Agent, or Firm*—St. Onge Steward, Johnston, Reens & Noë

[57] ABSTRACT

Multi-station reaction injection molding apparatus is disclosed for in-place foaming of polymerizable resins in articles advanced along a production line, as for example in the manufacture of insulated appliance housings such as refrigerator cabinets. The articles are selectively diverted from a feed conveyor, one to each of a plurality of pour stations adjacent the feed conveyor. At the stations, injection of foamable resin mix is accomplished by reaction injection type molding heads which combine at least two liquid resin components. These components are suitably catalyzed to react and form a cellular or foamed polymerized resin. The liquid components are separately but continuously supplied to respective supply manifolds to which all of the heads are connected in parallel by shunting ducts. Excess unmixed liquid components are returned separately from each of the heads through recycle shunting ducts to respective recycle manifolds. Thus division of the component flows takes place among all of the heads, whereby to maintain temperature and compositional uniformity of the components as close to the point of mixing and injection as possible. Control means selectively determine the order in which each pour station injects foam mix into an article. That same control further produces a metered output of the respective components at elevated pressure sufficient to effect reaction injection mixing at the selected head, while simultaneously interrupting the flow of all components at all of the other heads. Reduction of off-ratio mixing problems, and greater uniformity of foam properties, are thus achieved.

1 Claim, 4 Drawing Figures

MULTI-STATION REACTION INJECTION MOLDING APPARATUS

This is a division of application Ser. No. 755,048, filed Dec. 28, 1976 now U.S. Pat. No. 4,150,074.

BACKGROUND OF THE INVENTION

1. Field of the Invention

The invention relates to multiple-station in-place foaming of reactive polymeric resin components introduced into articles which are being advanced along a production line. Although use of the invention is not so limited, it is more particularly adapted to apparatus and methods for integrating an insulating layer or blanket of cellular resin foam in appliance housings such as refrigerator cabinets.

2. Description of the Prior Art

The "foaming" of refrigerator cabinets is a well-established and defined industry of long standing. The operation involves incorporating an insulating blanket of resin foam by forming this in-place in the walls of the cabinets as they progress along a production line in a factory. Historically, the major production lines have employed a series of fixtures or jigs on which the cabinets are supported on movable transports to advance the cabinets through successive processing operations. Along with the moving fixtures, it has been conventional to employ low-pressure (50–100 psi), agitator-equipped, mixing heads for uniting the reactive polymers, and then open pouring the foam mix into the walls of each cabinet while it is being supported by its moving fixture.

The moving fixture concept necessarily involves complex mechanisms for physically transporting the fixtures through the various processing stations in order to subject the cabinets to the several operations required. Starting, stopping, opening, closing, reorienting, and similar handling operations, which must be accomplished in the processing of the cabinets cause complexity of the equipment utilizing this moving fixture approach. Furthermore, such equipment is not readily adapted to meet, from an economic standpoint, changing production conditions. Likewise it is apt to be limited in terms of production output. Additionally, the low pressure, agitator-equipped mixing heads typically used require solvent or air flushing between pour operations and can not satisfactorily handle some of the more highly reactive polymeric compositions, nor insure rapid dispersion of the foam mix throughout the whole area of the cabinet or other article.

The alternate use of stationary fixtures for supporting the articles to be foamed, in combination with conveyor arrangements for moving the articles to such fixtures and positioning or orienting an article in each fixture, is also not new. Such arrangement has the advantage of simplifying the transport mechanism used in moving the articles to and from the fixtures, and in the handling of electrical and mechanical connections, since the connections do not move with the articles in this case. Moreover, in this system it is much simpler to increase production output of a product line, since it is only necessary to parallel additional fixture stations to which the articles can be delivered. This contrasts with physically increasing the length of path of the moving fixture arrangement, in order to insert additional fixtures in the train of the fixtures as would be required in that arrangement. Likewise, if a stationary fixture is made inoperative for purposes of clean-up or maintenance, this does not interrupt the processing of articles at other stations, which is not true of the other system.

More recent innovations have incorporated the stationary fixture concept with high pressure, impingement mixing (reaction injection mixing) foam dispensing heads. The use of high pressure (1,000–3,000 psi) metering and mixing allows more reactive chemical formulations to be used, and this reduces curing time and consequently speeds up production. It also insures better distribution of foam mix throughout the article to be "foamed".

With the use of multiple-station foaming systems, problems arise because of the necessity of feeding the reactive liquid resin components to each of the foaming stations which of necessity must be physically separated some distance. It is economically disadvantageous to use individual component storage, pumping, temperature conditioning, metering and recycling units for each of the stations, since such systems are relatively complex and expensive. On the other hand the provision of a single source of component feed, etc. for all stations of a multiple-station installation requires long conduit lines. This leads in turn to problems of adequately maintaining temperature and compositional uniformity throughout the system. It also increases the possibility of line swelling due to pressure surges, resulting in lead or lag of component feed and thus producing temporary off-ratio foam mixes. It is accordingly a principal object of this invention to effect improvement in respect to these problems.

SUMMARY OF THE INVENTION

In order to achieve greater uniformity of the foam product produced in a production line utilizing a plurality of pour stations, a manifold system is provided for each of the several liquid components employed in making the foam mix. Each component is pumped from a storage point, through temperature and pressure controllers and metering devices, to a supply manifold from which shunt connection is made to the mixing head at each of the several pour stations in the system. Similarly, a return or recycle manifold connected to the end of the supply manifold leads back to the storage point, and shunt connections are made from all of the mixing heads to the recycle manifold. Flow of each component through its respective manifold is continuous. During periods when no mixing head is in "pour" condition (i.e., in a mix/inject cycle), the component flow is divided among all heads so that each is supplied with a constantly renewed supply of component. When a mixing head is signaled by appropriate control means to "pour", that control also simultaneously initiates other operations. First, it interrupts normal recirculation flow of the several components through all of the heads except the head selected to "pour". It also interrupts flow from the end of the supply manifold into the recycle manifold. This is done by energizing shut-off valves located in the respective shunting ducts between the supply manifolds and the mixing heads. At the same time, high pressure pump or other metering devices are energized to increase the pressure of the components in the supply manifolds to a level adequate to effect reaction injection metering while a plunger in the mixing head is conditioned to allow streams of the reactive components to impinge in a mixing chamber of the head, and to expel the resulting foam mix through a nozzle into the refrigerator cabinet, etc. Immediately upon completion of the "pour" cycle, all of the shunting valves are again opened to allow normal recycling of the components through the respective heads, as well as through the manifold systems.

The system described generally above and in more detail hereinafter accordingly provides greater assurance that the reactive components which are mixed at any given mixing head will be more uniform in terms of temperature and compositional characteristics throughout the pour cycle, thus insuring better "on-ratio" mix and consequently more uniform physical properties in the finished foamed product.

The arrangement is illustrated in the accompanying drawings and described in some detail hereinafter in a typical refrigerator cabinet foaming application. It will be apparent from such illustration, however, that the specific description is illustrative and that other applications within the scope of the appended claims can be made of the inventive concept.

DETAILED DESCRIPTION OF THE PREFERRED EMBODIMENT

Figure 1:
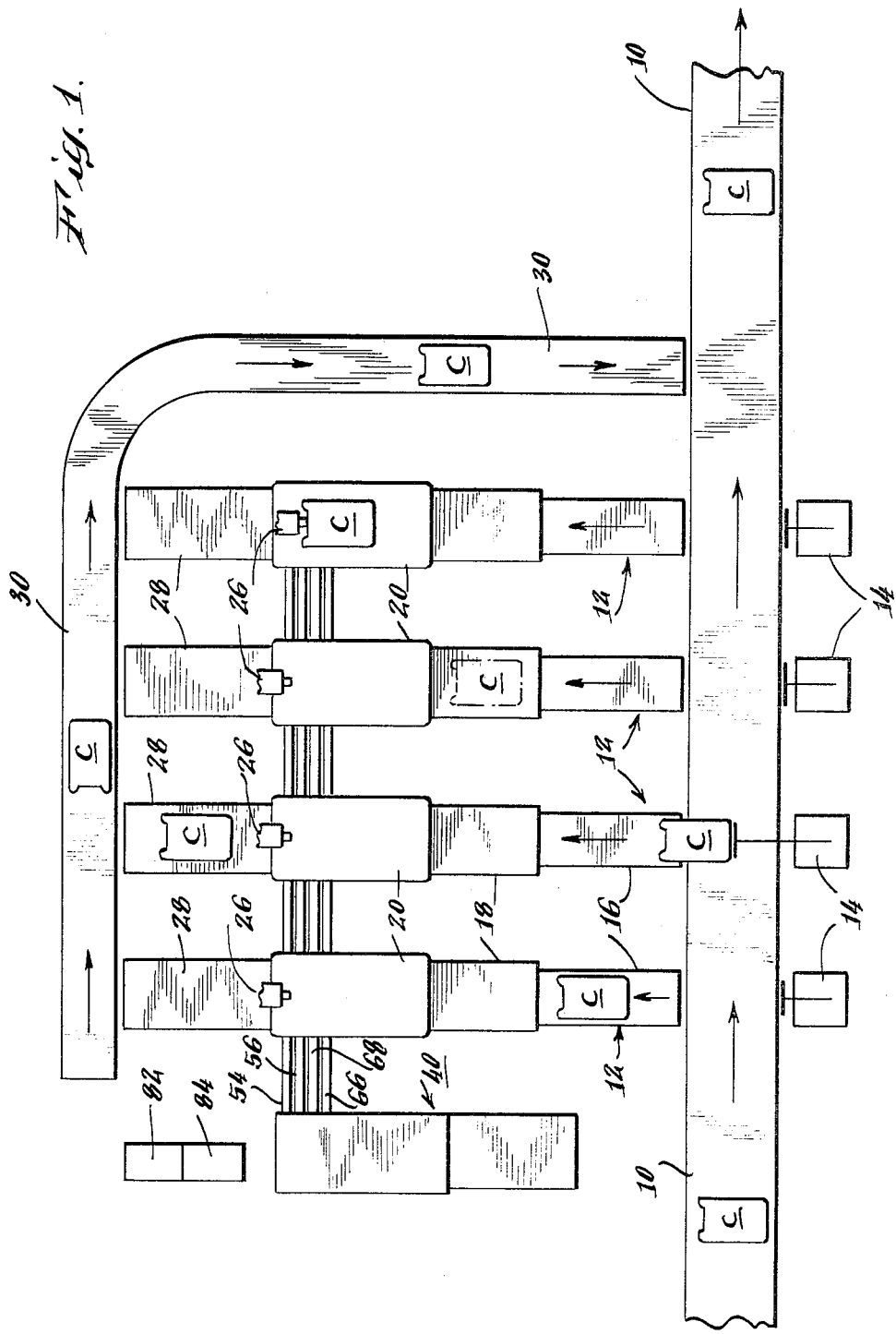
FIG. 1 is a diagrammatic plan view of a production line for refrigerator cabinet foaming, employing four foaming stations.

A plan view of a four-station production line for foaming refrigerator cabinets is shown in FIG. 1, wherein the cabinets C are advanced along a main conveyor 10, from left to right as viewed in the drawing. Four lateral conveyors 12 in parallel spaced relation extend perpendicularly from the main conveyor, and diverting means 14 corresponding to each of laterals 12 are spaced along the main conveyor to divert cabinets C from the main conveyor onto the respective lateral. Automated control means (not shown) of conventional type is programmed to divert the cabinets onto the respective laterals on a space-available basis.

Figure 3:
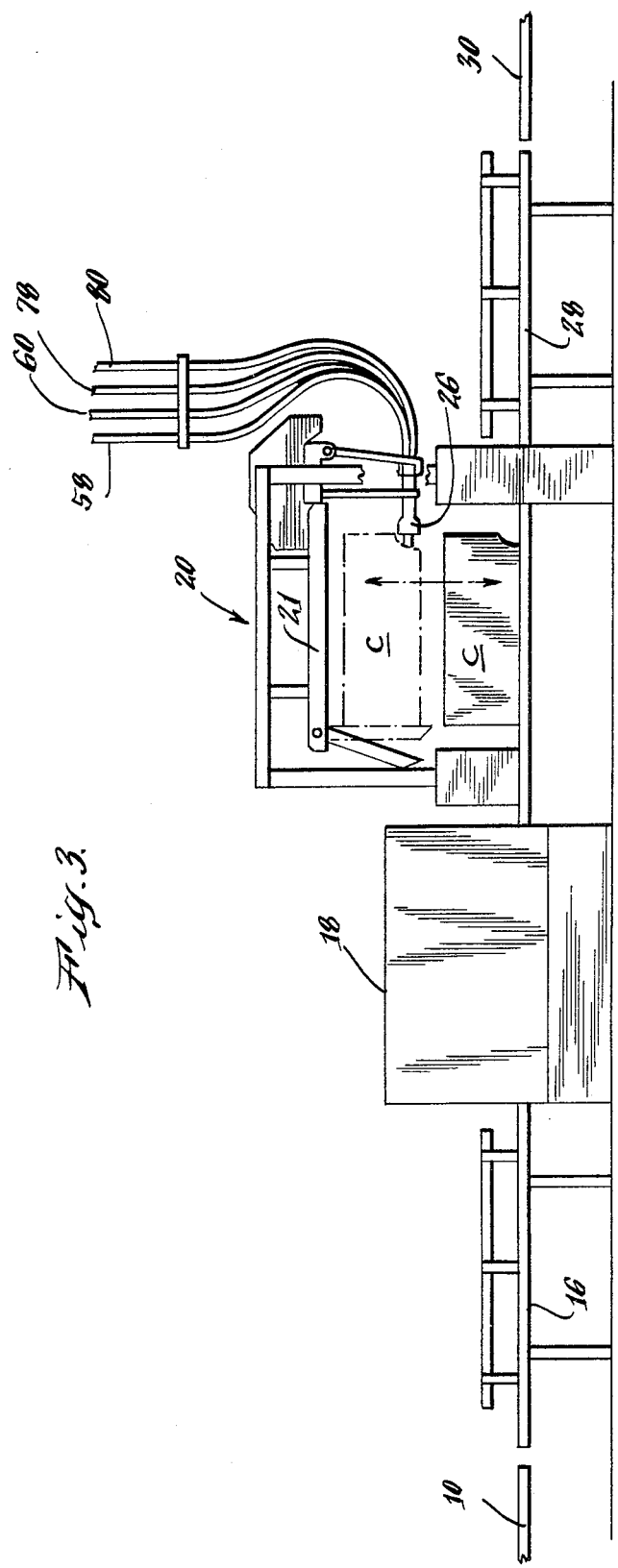
FIG. 3 is a side elevational view, again of diagrammatic foam of one of the pour stations, showing means for transporting a cabinet to the stationary fixture at the pour station, and for coordinating the injection of the foam mix into the cabinet.

Each lateral conveyor comprises a ready or hold conveyor 16 onto which the cabinets are initially received and which feeds these into a pre-heat over 18 incorporating infrared heating elements or the equivalent. From the pre-heat oven, the cabinets are transferred to a foaming station 20 which includes a vertically reciprocable jig or clamping device 21 adapted to be lowered onto the cabinet and to lift it into "pour" position. In such position, a filling port in the cabinet wall is brought into alignment with an injection nozzle 24 of a mixing head 26. As seen in FIG. 3 head 26 is moved horizontally to effect registration of its nozzle 24 with the port of the cabinet during completion of the pour or inject cycle. It is then withdrawn to permit jig 21 to return the cabinet to its lowered position on the lateral conveyor, from which it is advanced to a post-foam accumulator section 28 of the lateral conveyor. From this latter, it is transferred to a discharge conveyor 30 which picks up the cabinets from all of the several stations and feeds them back onto main conveyor 10, downstream of the foaming stations.

Figure 2:
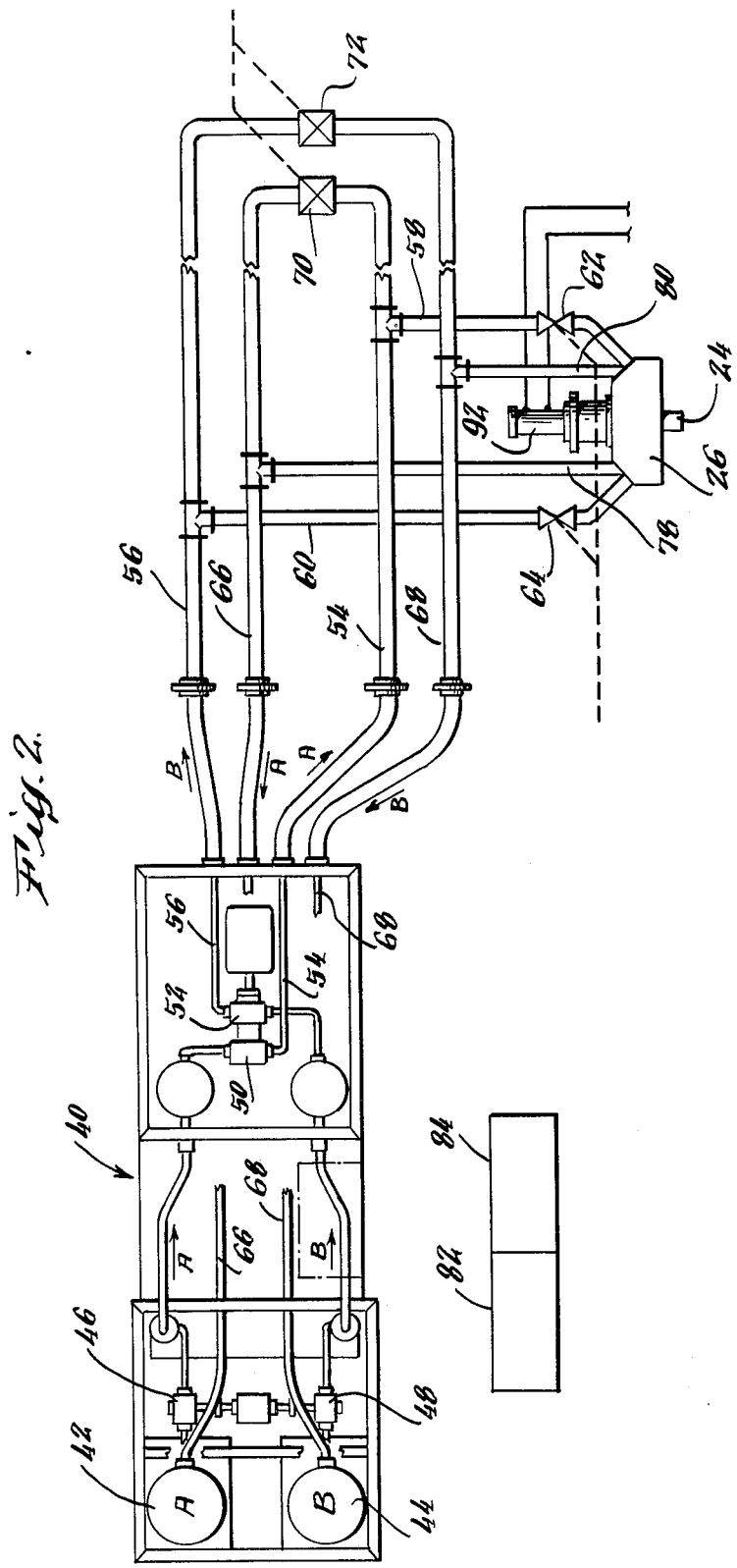
FIG. 2 is also a diagrammatic view in plan showing a foam mix supply system utilizing two reactive liquid resin components, wherein the system includes storage, temperature conditioning, recycle pumping and high pressure metering equipment and the associated supply and recycle manifolds, connection of only one of the four pour station mixing heads being here illustrated.
Figure 4:
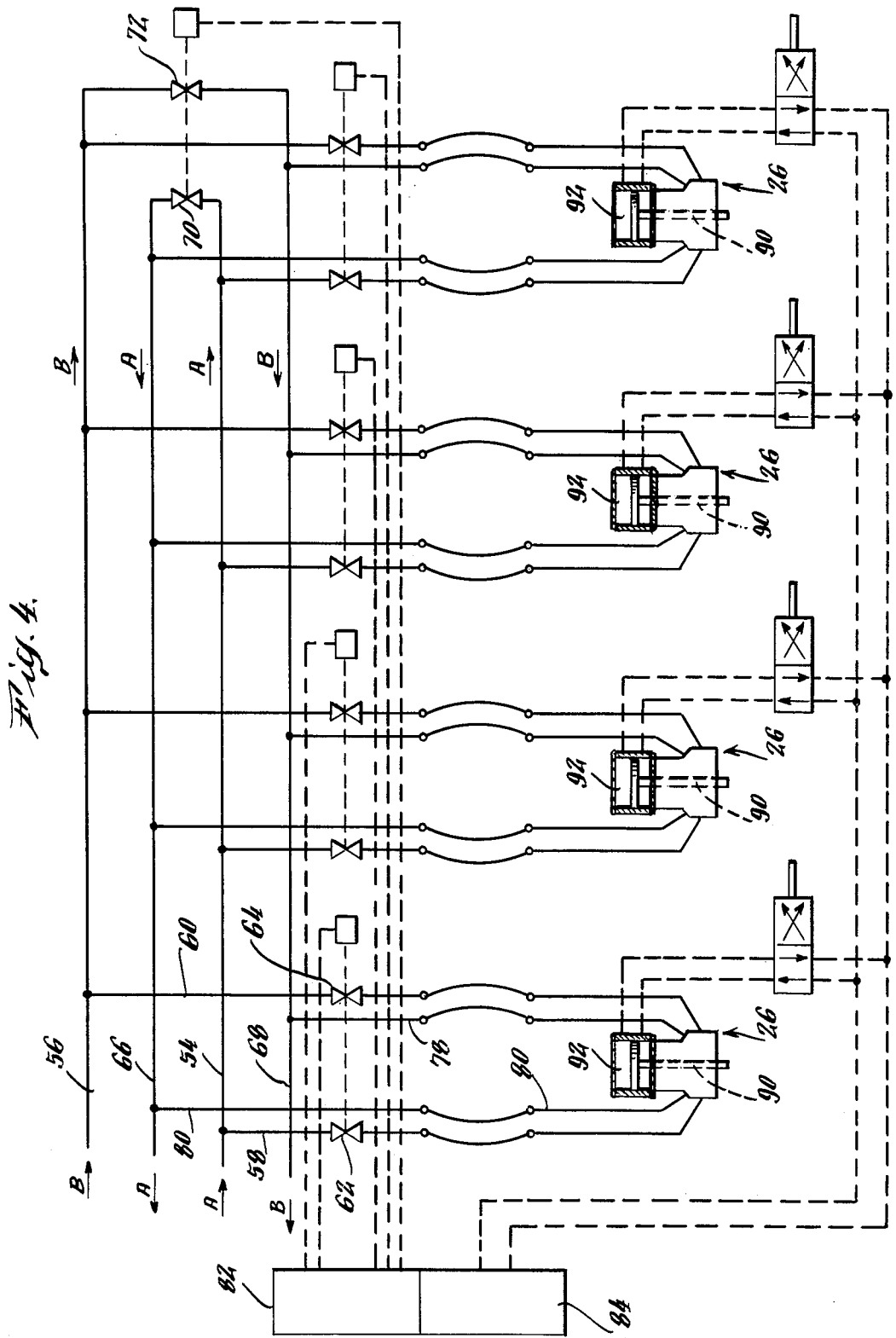
FIG. 4 is a flow diagram of the multi-station system.

As shown graphically in FIG. 2 and schematically in FIG. 4 of the drawings, each mixing head 26 is supplied through fixed and flexible conduits with reactive polymeric liquid resin components. For simplification, the system as here illustrated is of the two-component type, the two major components being a polyol and an isocyanate but in which there are also incorporated the necessary catalysts, foaming agents, etc. Such two-component systems are common in polyurethane foaming operations. Obviously other systems employing more than two components can be utilized.

A centralized station, indicated generally at 40, comprises component storage tanks 42, 44 for the respective reactive components A, B. Low pressure recycling pumps 46, 48, respectively, feed the liquid components through suitable heat exchange devices for temperature control and then to feed high pressure pumps or equivalent metering devices 50, 52. These latter are used to develop the necessary high pressures for reaction injection mixing at the several heads during the relatively short periods that are involved during the "pour". The several components flow through or around the high pressure pumps 50, 52 when these are not in operation, so as to maintain continuous flow of components to respective supply manifolds 54, 56. These manifolds service all of the pour stations 20 through shunting connections made from the respective mixing head 26 at each station to these manifolds. As seen in FIG. 2, head 26 is supplied with component A through shunt supply duct 58, and with component B through shunt supply duct 60. Remotely operated shut-off valves 62, 64, respectively, are disposed in these lines, for a purpose to be described hereinafter.

The manifold system also incorporates return or recycle manifolds 66, 68, which make connection at the downstream ends of the respective supply manifolds 54, 56, being connected through remotely actuated shut-off valves 70, 72, respectively, as seen in FIG. 4. The opposite (downstream) ends of the respective return manifolds make fluid connection back to the respective storage tanks 42, 44. Each head 26 is also connected to return manifolds 66, 68 through respective recycle shunting lines 78, 80.

All of the several shunt and manifold shut-off valves 62, 64, 70 and 72 are operatively connected for simultaneous operation by control means 82 which is functionally integrated with a master control 84 (FIG. 1). This selectively determines the order in which pour station will be energized to inject foam mix into a cabinet at the several foaming stations.

In operation, the liquid resin components A and B are pumped by their respective low pressure pumps 46, 48 from the supply tanks 42, 44 to the high pressure metering devices 50, 52, and assuming these are not in operation, the components pass at low pressure to the respective supply manifolds 54, 56. Recycle flow is thus established in the manifolds through manifold shut-off valves 70, 72 and back through recycle ducts 66, 68 and to the respective storage tanks, so long as the valves are open. Flow of each component through the respective manifolds, furthermore, produces shunt flow through the respective shunt supply and recycle ducts 58, 60 and 78, 80 at each mixing head 26, whenever the respective shut-off valves 62, 64 are open, which is their normal condition. Thus each mixing head is constantly supplied with thermally and compositionally stabilized reactive components immediately adjacent the point in the heads where reaction injection mixing takes place.

When a selected pour station is signaled by controller 84 to initiate a pour cycle, that simultaneously produces a signal for control means 82 to operate all of the shut off valves 62, 64 for all of the mixing heads except those at the selected station. Manifold valves 70, 72 are also closed at this time. Simultaneously, master control 84 energizes the high pressure metering devices 50, 52 to boost the low recycle pressure in supply manifolds 54, 56 to a pressure level, generally on the order of 2000 to 3000 psi, necessary to effect reaction injection mixing in the selected mixing head. Coordinated with this, a hydraulically actuated plunger 90, illustrated schematically in FIG. 4, is withdrawn in mixing head 26 to interrupt the recycle flow of the several components at that point in the head, and to uncover the injection ports of the respective components in the head to allow opposed streams of the components to impinge against each other within a mixing chamber vacated by the plunger. The physical construction of this type of mixing head is conventional and forms no part of the present invention. Several types are commercially available, for example from Admiral Equipment Division of The Upjohn Company at Akron, Ohio. The foam mix thus produced flows from the mixing chamber through nozzle 24 of the head 26. Controller 84 has meanwhile energized the jig at the selected foaming station to raise a cabinet to effect registration of a foaming port in cabinet C with the nozzle so that the foam mix is introduced into the cabinet. The components react to complete their foaming and polymerizing reaction to produce the foamed insulation.

The amount of foam mix injected into each cabinet is carefully metered by master control 84, and plunger 90 is actuated in the reverse direction at the close of the pour cycle to return it to its initial position. In doing so it expels all mixed components from the mixing chamber of the head and again establishes a recycling flow of the individual components past their respective orifices in the head, utilizing recycling bypass channels in the plunger, to return through the respective recycle shunts to the recycle manifolds. Hydraulic actuators 92 control the action of the plunger, and these also are coordinated by controller 84.

The significance of providing the shut-off valves in the manifold and shunting duct system described above can be better appreciated from the following description of a typical cycle of operation in the foaming of a refrigerator cabinet:

| Operation | Approximate Time |
| --- | --- |
| Receive cabinet | 5 seconds |
| Raise cabinet and insert plug | 5 seconds |
| Close exterior | 5 seconds |
| Insert foam nozzle | 3 seconds |
| Shoot foam | 5 seconds |
| Retract foam nozzle | 2 seconds |
| Cure polymeric mix | 200 seconds |
| Open exterior | 5 seconds |
| Lower cabinet | 5 seconds |
| Discharge cabinet | 5 seconds |
| Total | 240 seconds |

It will be seen that in this typical cycle, the pour time is only about 5 seconds. As explained above, it is only during the pour time that the continuous recycle of the components through the system is interrupted by actuation of the shut-off valves. In practice, since only about 3 to 4 seconds must be allowed at the start of the pour cycle for the high pressure means to develop the operating pressure, and a few seconds must be allowed at the close of the pour cycle, the actual period of interrupted recycle flow through the several mixing heads is on the order of 10 seconds in this system. Thus, out of a total cycle time of 240 seconds, the recycle flow is only interrupted for 10 seconds for each head. Thus in a system such as that illustrated here with four foaming stations, the accumulated interruption in recycling flow through all of the heads in the system is only 40 seconds out of the total 240 second operation. Increasing the number of stations in the system will proportionally increase the recycle flow interruption time; but even in a six station system, the total interruption will still only be about one quarter (60 seconds) of the total cycle period of operation. The system accordingly provides means for reducing problems of off-ratio mixture, commonly encountered at the start of the injection or pour cycle due to non-uniform temperature or compositional characteristics of the several components at the point in the mixing head immediately adjacent the mixing chamber. Since the invention ensures that supply of the several components to those points in all of the mixing heads is virtually constantly renewed, except for the relative short interruption time, it becomes possible to maintain a steady ambient condition at the very point where mixing occurs.

What is claimed is:

1. Apparatus for multiple-station in-place foaming of a reactive polymeric resin composition in articles advancing along a production line;

conveyor means for advancing said articles, and means for diverting said articles, one to each of a plurality of pour stations adjacent said conveyor means, as the respective stations become available to receive an on-coming article;

a mixing head of the reaction injection molding type at each pour station, said heads being adapted to receive at least two different reactive liquid components, mix these and inject the mixture into the article at the pour station;

supply and recycle manifolds for each of said reactive liquid components, and supply and recycle shunt ducts interconnecting each mixing head with the respective manifolds, whereby said mixing heads are disposed in parallel flow connection across said manifolds;

low pressure pump means adapted to continuously supply liquid components of preselected low pressure to each of said supply manifolds to cause component flow to divide among the parallel-connected mixing heads and return through said recycle shunt ducts and manifolds, whereby to maintain temperature and compositional uniformity of the several components at all of the heads of the system;

control means for selectively determining the order in which each pour station will inject foam mix into an article, and for initiating that operation;

shut-off valves between the respective supply and recycle manifolds and in the supply shunt ducts to each of said mixing heads, said valves being operatively connected to said control means for simultaneous actuation thereby;

high pressure metering means connected in series flow with said low pressure pump means and adapted to increase the pressure of the respective components in said supply manifolds to a preselected level sufficient to achieve reaction injection mixing and molding in the articles, said high pressure metering means also being operatively controlled by said control means;

said control means having provision for simultaneously energizing said high pressure metering means and closing all of said shut-off valves except that to the mixing head selected by said control means for initiation of reaction injection molding.

* * * * *

Disclaimer

4,218,203.—*Peter J. Tilgner*, Akron, Ohio. MULTI-STATION REACTION INJECTION MOLDING APPARATUS. Patent dated Aug. 19, 1980. Disclaimer filed Jan. 7, 1982, by the assignee, *The Upjohn Co.*

Hereby enters this disclaimer to claim 1 of said patent.

[*Official Gazette December 14, 1982.*]